US012656263B2

(12) United States Patent
Chung

(10) Patent No.: US 12,656,263 B2
(45) Date of Patent: Jun. 16, 2026

(54) RAPID DIAGNOSTIC KIT READER

(71) Applicant: ELECTRONICS AND TELECOMMUNICATIONS RESEARCH INSTITUTE, Daejeon (KR)

(72) Inventor: Kwang Hyo Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 157 days.

(21) Appl. No.: 18/433,573

(22) Filed: Feb. 6, 2024

(65) Prior Publication Data

US 2024/0353345 A1    Oct. 24, 2024

(30) Foreign Application Priority Data

Apr. 24, 2023    (KR) ........................ 10-2023-0053523

(51) Int. Cl.
*G01N 21/84*        (2006.01)
*G01N 21/29*        (2006.01)
(Continued)

(52) U.S. Cl.
CPC ......... *G01N 21/8483* (2013.01); *G01N 21/29* (2013.01); *B01L 2300/0825* (2013.01); *G01N 21/01* (2013.01); *G01N 2021/0118* (2013.01); *G01N 2021/1765* (2013.01); *G01N 21/33* (2013.01); *G01N 21/64* (2013.01); *G01N 2021/7759* (2013.01);
(Continued)

(58) Field of Classification Search
CPC .... G01N 21/8483; G01N 21/29; G01N 21/01; G01N 21/33; G01N 21/64; G01N 2021/0118; G01N 2021/1765; G01N 2021/7759; G01N 2021/7786; G01N 2201/0222; G01N 2201/062; G01N 2201/0634; G01N 21/6428; G01N 21/6456; G01N 21/6486; G01N 21/78; G01N 33/48; G01N 2021/6439; G01N 2021/6463; B01L 2300/0825; G06T 7/0012
See application file for complete search history.

(56) References Cited

U.S. PATENT DOCUMENTS 8,916,390 B2    12/2014    Ozcan et al.
11,333,607 B2    5/2022    Lee et al.
(Continued)

FOREIGN PATENT DOCUMENTS

KR        101388691 B1 *  4/2014    ............. G01N 21/78
KR        10-1530938 B1    6/2015
(Continued)

*Primary Examiner* — Michelle M Iacoletti
*Assistant Examiner* — Judy Dao Tran
(74) *Attorney, Agent, or Firm* — LRK PATENT LAW FIRM

(57)        ABSTRACT

The present invention relates to a rapid diagnostic kit reader including a measurement module into which a rapid diagnostic kit is inserted and a smart terminal that is seated on the measurement module, photographs a membrane of the rapid diagnostic kit inserted into the measurement module, analyzes an image captured by photographing the membrane, and determines a diagnosis result of the rapid diagnostic kit.

18 Claims, 9 Drawing Sheets

(51) Int. Cl.

| | |
|---|---|
| *G01N 21/01* | (2006.01) |
| *G01N 21/17* | (2006.01) |
| *G01N 21/33* | (2006.01) |
| *G01N 21/64* | (2006.01) |
| *G01N 21/77* | (2006.01) |

(52) U.S. Cl.

CPC ................ *G01N 2021/7786* (2013.01); *G01N 2201/0222* (2013.01); *G01N 2201/062* (2013.01); *G01N 2201/0634* (2013.01)

(56) References Cited

U.S. PATENT DOCUMENTS

| | | | |
|---|---|---|---|
| 2010/0144020 A1 | 6/2010 | Kim et al. | |
| 2011/0278472 A1* | 11/2011 | Atzler | G01J 3/0202 |
| | | | 250/459.1 |

| | | | |
|---|---|---|---|
| 2012/0156714 A1* | 6/2012 | O'Brien | G01N 21/6428 |
| | | | 435/29 |
| 2014/0154789 A1* | 6/2014 | Polwart | G01N 21/8483 |
| | | | 422/403 |
| 2020/0375499 A1* | 12/2020 | Hansen | A61B 5/4216 |
| 2022/0084659 A1* | 3/2022 | Rowe | G06V 10/993 |
| 2023/0021068 A1 | 1/2023 | Cooper | |
| 2023/0160806 A1* | 5/2023 | Zhao | G01N 15/1434 |
| | | | 250/459.1 |

FOREIGN PATENT DOCUMENTS

| | | | |
|---|---|---|---|
| KR | 10-1579045 | B1 | 12/2015 |
| KR | 10-1881223 | B1 | 7/2018 |
| KR | 10-2005597 | B1 | 7/2019 |
| KR | 10-2020-0132027 | A | 11/2020 |
| KR | 10-2020-0134405 | A | 12/2020 |
| KR | 10-2484594 | B1 | 1/2023 |

* cited by examiner 400-1

Figure 8:
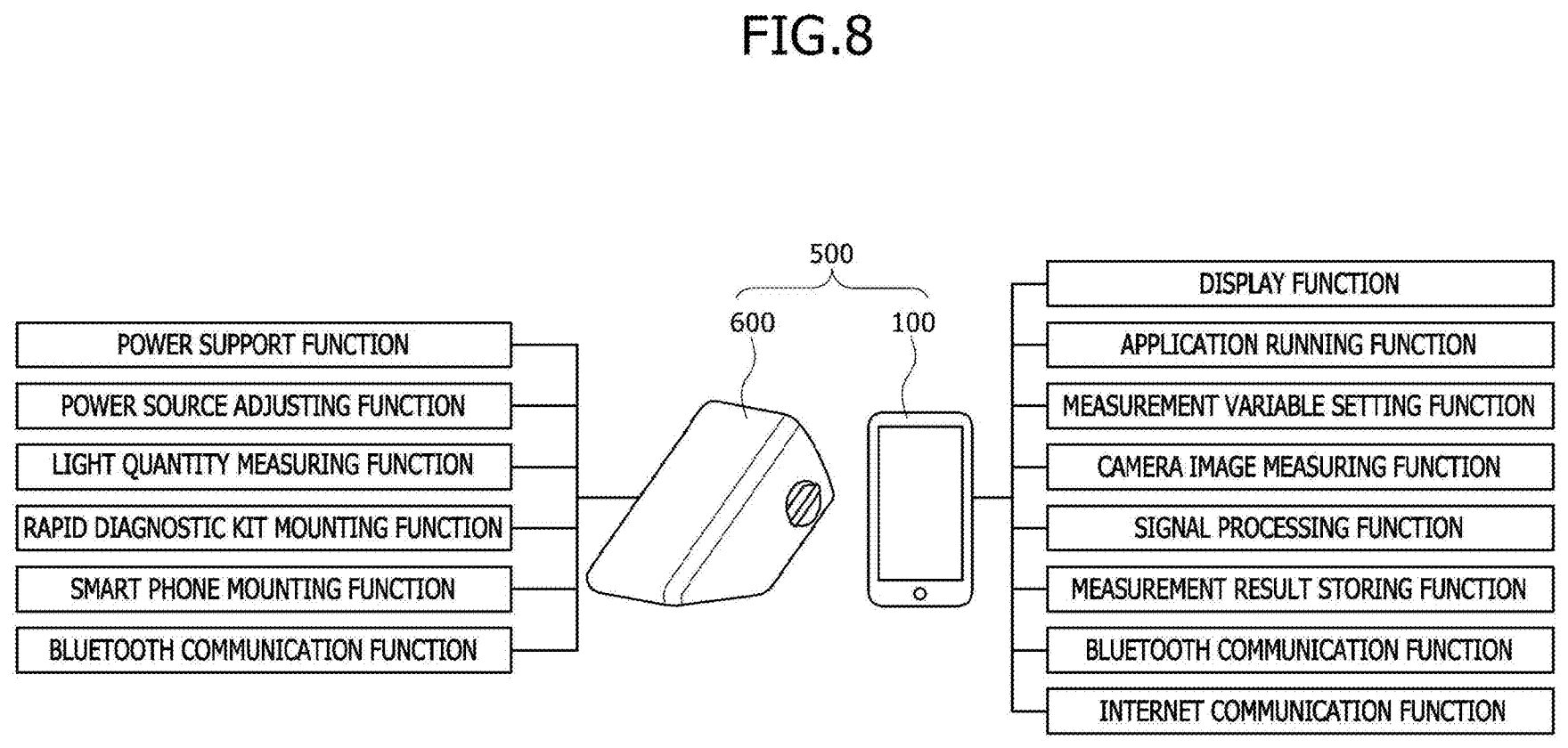

DISPLAY FUNCTION

APPLICATION RUNNING FUNCTION

MEASUREMENT VARIABLE SETTING FUNCTION

CAMERA IMAGE MEASURING FUNCTION

SIGNAL PROCESSING FUNCTION

MEASUREMENT RESULT STORING FUNCTION

BLUETOOTH COMMUNICATION FUNCTION

INTERNET COMMUNICATION FUNCTION

100

500

600

POWER SUPPORT FUNCTION

POWER SOURCE ADJUSTING FUNCTION

LIGHT QUANTITY MEASURING FUNCTION

RAPID DIAGNOSTIC KIT MOUNTING FUNCTION

SMART PHONE MOUNTING FUNCTION

BLUETOOTH COMMUNICATION FUNCTION

RAPID DIAGNOSTIC KIT READER

CROSS-REFERENCE TO RELATED APPLICATION

This application claims priority to and the benefit of Korean Patent Application No. 10-2023-0053523, filed on Apr. 24, 2023, the disclosure of which is incorporated herein by reference in its entirety.

BACKGROUND

1. Field of the Invention

The present invention relates to a rapid diagnostic kit reader.

2. Description of Related Art

A rapid diagnostic kit is a field diagnostic tool that performs diagnosis with a simple operation of putting a sample into the field diagnostic tool in a field in which the diagnosis is needed. The rapid diagnostic kit is manufactured to quickly and visually identify the presence or absence of a target biomaterial when the target biomaterial is present in the sample. The target biomaterials are mainly pathogenic microorganisms or proteins. In the rapid diagnostic kit, an antibody or antigen that may be selectively bound to the target biomaterial is installed at a specific location, causing a selective antigen-antibody reaction, so that a result of the reaction may be identified in a band shape through markers.

Various nanomaterials and fluorescent substances are used for the markers.

In the case of a gold nanoparticle-based rapid diagnostic kit that may be visually inspected, when the amount the target biomaterial in the sample is small, a weak band-shaped signal may occur. In this case, it is difficult for a user to visually inspect the rapid diagnostic kit and thus the user may make incorrect judgments.

In the case of the rapid diagnostic kit to which the fluorescent substances are applied, generally, it is difficult to visually inspect a rapid diagnostic kit, and it is required to radiate light having a specific wavelength that excites fluorescence.

Due to the possibility of errors in visual discrimination and the need for luminescent tools, there is a need for a reader that may quantitatively determine a diagnostic result of the rapid diagnostic kit. Further, with the expansion of a digital healthcare market, as the demand for field diagnosis increases, the need for a reader that is miniaturized and low-cost is increasing.

A rapid diagnostic kit reader according to the related art is implemented as a device that digitalizes a signal line of the rapid diagnosis kit, but the rapid diagnostic kit reader itself is provided with an optical component, a sensor, a display, a control board or the like and thus is expensive and bulky.

Further, the rapid diagnostic kit reader according to the related art is implemented as a color-generative rapid diagnostic kit that may be identified visually and different devices for measuring fluorescent rapid diagnostic kits that require excitation light sources.

Further, it is substantially different for the rapid diagnostic kit reader to respond to variations in external sizes and shapes and the number of signal lines of various rapid diagnostic kits.

Further, the conventional rapid diagnostic kit reader does not measure the amount of light radiated to adjust and stabilize the intensity of a light source, and thus there is a problem in that measurement accuracy is degraded.

Korean Patent Application Publication No. 10-2020-0134405 (published on Dec. 2, 2020) discloses the background of the present invention.

SUMMARY OF THE INVENTION

The present invention is directed to providing a rapid diagnostic kit reader capable of simultaneous measurement of fluorescent and color-generative rapid diagnostic kits.

According to an aspect of the present invention, there is provided a rapid diagnostic kit reader including a smart terminal, wherein the smart terminal includes a user interface unit, a camera that photographs a membrane of a rapid diagnostic kit inserted into a measurement module, and a processor that determines a diagnosis result of the rapid diagnostic kit based on an image captured by photographing the membrane and displays the diagnosis result through the user interface unit, and the smart terminal is seated on the measurement module.

The processor may receive a measurement variable through the user interface unit and transmits the received measurement variable to the measurement module.

The measurement variable may include at least one of a type of rapid diagnostic kit, a type of light source that radiates light into the measurement module, an intensity of light source, and a signal processing variable for determining the diagnosis result of the rapid diagnostic kit.

The processor may process an RGB signal of the image captured by photographing the membrane to obtain a quantitative numerical value for each signal line of the rapid diagnostic kit, and may compare the quantitative numerical value with a preset positive determination reference value, a preset negative determination reference value, and a preset retest determination reference value to determine a reaction result as one of a positive state, a negative state, and a retest state according to the comparison result.

The processor may extract the number of pixels of a data acquisition area in the membrane on an X axis and an Y axis from the image captured by photographing the membrane, may calculate pixel information for each pixel by applying an RGB weighting value set for each RGB for each pixel, may calculate horizontal line data by averaging NY horizontal lines based on the pixel information, may calculate a maximum value for each signal line by subtracting a baseline value in which there is no signal in the data acquisition area from the horizontal line data, may calculate a numerical area for each signal line based on the maximum value for each signal line, and then may calculate a representative value of the numerical area.

According to another aspect of the present invention, there is provided a rapid diagnostic kit reader including a slot through which a rapid diagnostic kit is inserted into a housing or is discharged to the outside, a photographing assistant unit that allows a camera of a smart terminal to photograph the rapid diagnostic kit inserted into the housing, a light source that illuminates the rapid diagnostic kit inserted into the housing; and a control board that controls the light source to illuminate the rapid diagnostic kit so that the camera of the smart terminal photographs the rapid diagnostic kit inserted into the housing.

The rapid diagnostic kit reader may further include a smart terminal seating unit formed in the housing to allow the smart terminal to be seated in the housing.

The photographing assistant unit may be a transparent window formed transparently at a position corresponding to the camera of the smart terminal.

In the transparent window, an optical filter may be additionally mounted or replaced according to fluorescence used in the rapid diagnostic kit.

The light source may include at least one of a white light emitting diode (LED) that radiates white light and an ultraviolet ray (UV) LED that radiates ultraviolet light.

The rapid diagnostic kit reader may further include a light quantity measuring unit that measures a light quantity inside the housing, wherein the control board may control the light source according to a quantity of light inside the housing, which is measured by the light quantity measuring unit, to adjust a quantity of light inside the housing.

The rapid diagnostic kit reader may further include an optical path adjusting unit that uniformly radiates light of the light source onto a surface of a membrane of the rapid diagnostic kit.

The control board may receive a measurement variable from the smart terminal and control the light source according to the measurement variable.

The measurement variable may include at least one of a type of rapid diagnostic kit, a type of light source, an intensity of light source, and a signal processing variable for determining a diagnosis result of the rapid diagnostic kit.

According to still another aspect of the present invention, there is provided a rapid diagnostic kit reader including a measurement module into which a rapid diagnostic kit is inserted, and a smart terminal that is seated on the measurement module, photographs a membrane of the rapid diagnostic kit inserted into the measurement module, analyzes an image captured by photographing the membrane, and determines a diagnosis result of the rapid diagnostic kit.

The smart terminal may include a user interface unit, a camera that photographs the membrane of the rapid diagnostic kit inserted into the measurement module, and a processor that determines a diagnosis result of the rapid diagnostic kit based on an image captured by photographing the membrane and displays the diagnosis result through the user interface unit.

The processor may process an RGB signal of the image captured by photographing the membrane to obtain a quantitative numerical value for each signal line of the rapid diagnostic kit, and may compare the quantitative numerical value with a preset positive determination reference value, a preset negative determination reference value, and a preset retest determination reference value to determine a reaction result as one of a positive state, a negative state, and a retest state according to the comparison result.

The processor may extract the number of pixels of a data acquisition area in the membrane on an X axis and an Y axis from the image captured by photographing the membrane, may calculate pixel information for each pixel by applying an RGB weighting value set for each RGB for each pixel, may calculate horizontal line data by averaging NY horizontal lines based on the pixel information, may calculate a maximum value for each signal line by subtracting a baseline value in which there is no signal in the data acquisition area from the horizontal line data, may calculate a numerical area for each signal line based on the maximum value for each signal line, and then may calculate a representative value of the numerical area.

The measurement module may include a smart terminal seating unit that is formed in a housing and seats the smart terminal on the housing, a slot through which the rapid diagnostic kit is inserted into the housing or discharged to the outside, a photographing assistant unit that allows a camera of the smart terminal to photograph the rapid diagnostic kit inserted into the housing, a light source that illuminates the rapid diagnostic kit inserted into the housing, a light quantity measuring unit that measures a quantity of light in the housing, and a control board that controls the light source according to the quantity of light inside the housing, which is measured by the light quantity measuring unit, and illuminates the rapid diagnostic kit.

The light source may include at least one of a white light emitting diode (LED) that radiates white light and an ultraviolet ray (UV) LED that radiates ultraviolet light.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 8 is a view illustrating functions of the smart terminal and a measurement module according to the embodiment of the present invention.

DETAILED DESCRIPTION OF EXEMPLARY EMBODIMENTS

Figure 1A:
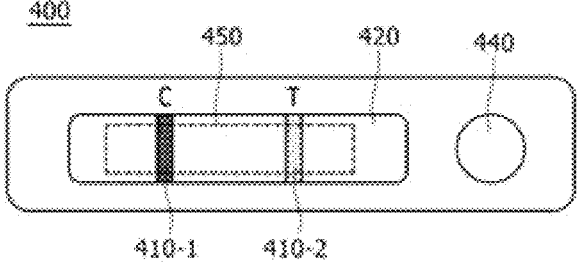
FIGS. 1A to 1C are views illustrating forms of a rapid diagnostic kit according to an embodiment of the present invention.

Hereinafter, embodiments of a rapid diagnostic kit reader according to the present invention will be described. In this process, the thickness of lines or the size of components illustrated in the drawings may be exaggerated for clarity and convenience of description.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Figure 1B:
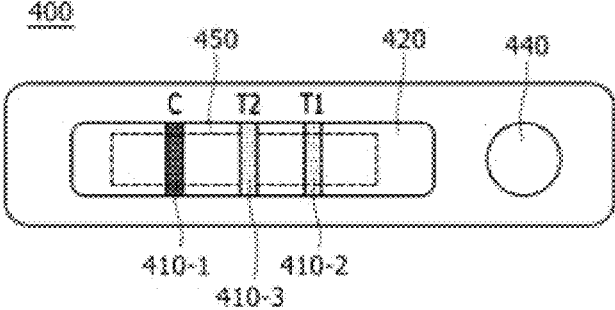
Figure 1C:
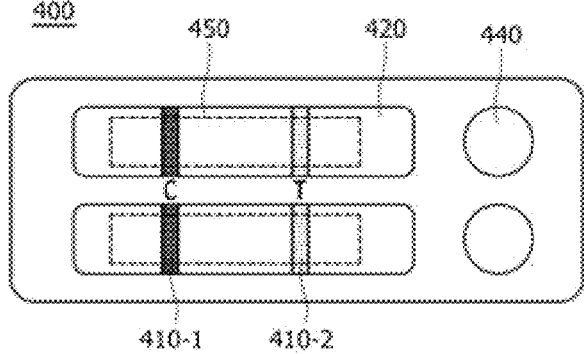

FIGS. 1A to 1C are views illustrating forms of a rapid diagnostic kit according to the embodiment of the present invention.

Referring to FIG. 1A, a rapid diagnostic kit 400 includes a membrane 420 and a sample inlet 440. A data acquisition area 450 is formed in the membrane 420.

A sample is input into the sample inlet 440. The sample introduced into the sample inlet 440 flows from the right side to the left side by capillary flow.

After a predetermined time has elapsed, one or more signal lines 410 appear on the membrane 420.

Referring to FIG. 1B, the signal line 410 is divided into test signal lines 410-2 and 410-3 and a control signal line 410-1. In general, the control signal line 410-1 is disposed downstream of the test signal lines 410-2 and 410-3.

The test signal lines 410-2 and 41-3 indicate the presence or absence and the amount of the target biomaterial that is a measurement target in the sample. The number of test signal lines 410-2 and 410-3 may be one or more, for example, one to three, depending on the number of measurement markers.

The control signal line 410-1 is formed to determine errors in the rapid diagnostic kit 400. The control signal line 410-1 indicates a case in which a normal test without errors is performed, and for example, one control signal line 410-1 may be formed.

A plurality of membranes 420, a plurality of sample inlets 440, and a plurality of data acquisition areas 450 may be disposed.

Referring to FIG. 1C, two or more membranes 420 may be installed on the one rapid diagnostic kit 400 as needed, and accordingly, two or more sample inlets 440 and two or more data acquisition areas 450 may be installed.

The rapid diagnostic kit reader 500 analyzes RGB data of an image extracted from the data acquisition area 450 in the membrane 420 to quantify and determine the degree of darkness of the signal line 410.

As illustrated in FIGS. 1A to 1C, the rapid diagnostic kit reader 500 may respond to various changes in the number of signal lines 410, the number of membranes 420, and the external sizes of the rapid diagnostic kit 400.

Figure 2:
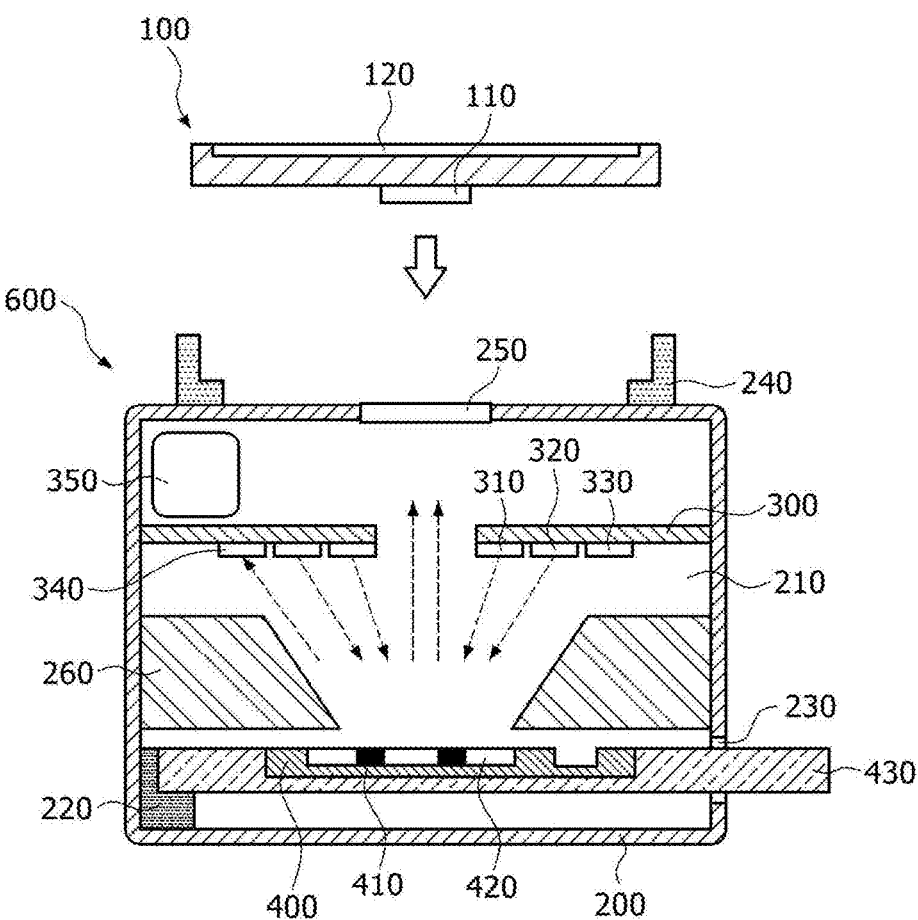
FIG. 2 is a configuration diagram of a rapid diagnostic kit reader according to the embodiment of the present invention.
Figure 3:
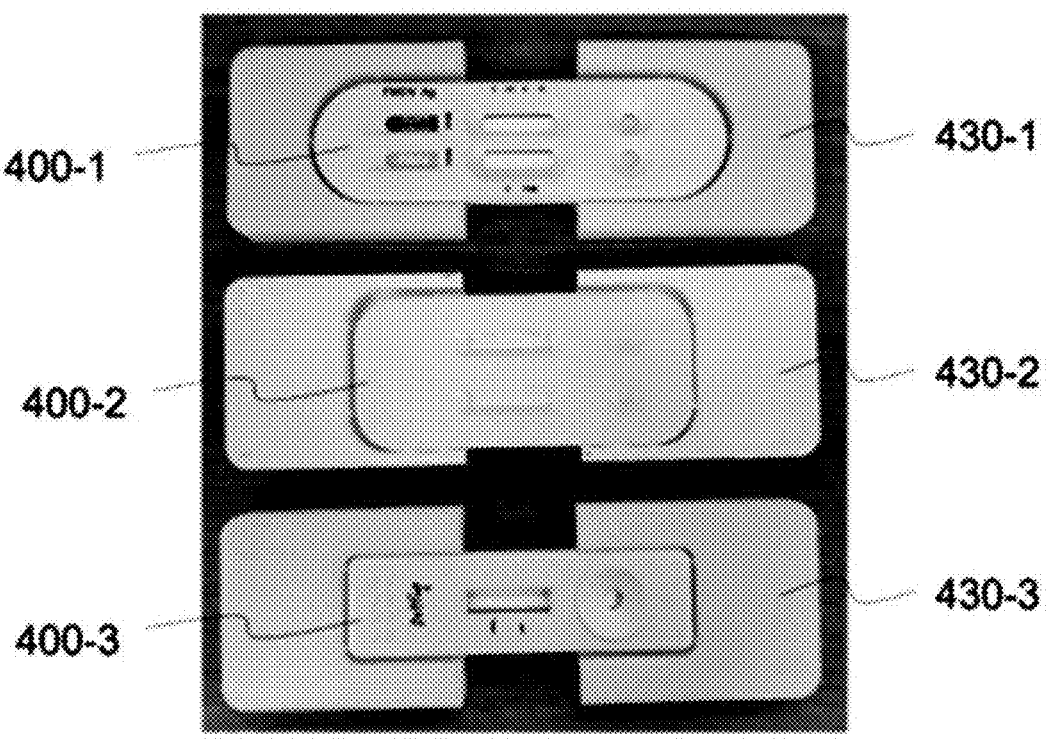
FIG. 3 is a view illustrating a kit tray according to the embodiment of the present invention.

FIG. 2 is a configuration diagram of a rapid diagnostic kit reader according to the embodiment of the present invention, and FIG. 3 is a view illustrating a kit tray according to the embodiment of the present invention.

Referring to FIG. 2, the rapid diagnostic kit reader 500 according to the embodiment of the present invention includes a smart terminal 100 and a measurement module 600.

The measurement module 600 and the smart terminal 100 may be coupled to or separated from each other.

The measurement module 600 illuminates the rapid diagnostic kit 400 so that the rapid diagnostic kit 400 is inserted thereinto and the rapid diagnostic kit 400 may be photographed.

The measurement module 600 includes a smart terminal seating unit 240, a photographing assistant unit 250, a control board 300, a battery 350, a tray fixing unit 220, an optical path adjusting unit 260, a light quantity measuring unit 340, light sources 310 and 320, and a slot 230.

The smart terminal seating unit 240 is formed in a housing 200 of the measurement module 600 to allow the smart terminal 100 to be seated on the measurement module 600.

The smart terminal seating unit 240 may be installed at various positions in the housing 200 according to a seating position of the smart terminal 100. For example, the smart terminal seating unit 240 may be formed on the measurement module 600.

The smart terminal seating unit 240 may be installed to correspond to the size and outer shape of the smart terminal 100 such that the smart terminal 100 may be seated.

The smart terminal seating unit 240 may include at least one of a pinch fixing mechanism, a spring fixing mechanism, and a magnetic fixing mechanism, and a smart terminal seating method of the smart terminal seating unit 240 is not particularly limited.

The photographing assistant unit 250 may allow the smart terminal 100 to obtain an image of the rapid diagnostic kit 400 inside the housing 200 when the smart terminal 100 is seated on the measurement module 600.

To this end, the photographing assistant unit 250 may be a transparent window formed transparently at a position of the smart terminal 100, which corresponds to a camera 110. For example, the photographing assistant unit 250 may be a transparent glass window or a transparent plastic window. Alternatively, the photographing assistant unit 250 may be perforated.

Moreover, the photographing assistant unit 250 may acquire an image in a specific wavelength range according to fluorescence used in the rapid diagnostic kit 400. To this end, in the photographing assistant unit 250, an optical fiber may be additionally mounted or replaced. For convenience in replacing the optical filter, a mechanism for detachably attaching the optical fiber may be further provided in the photographing assistant unit 250.

The light sources 310 and 320, the light quantity measuring unit 340, and a communication unit 330 may be installed in the control board 300.

The control board 300 adjusts the light quantities of the light sources 310 and 320.

The control board 300 adjusts a light quantity of a white light emitting diode (LED) 310 or an ultraviolet ray (UV) LED 320 according to the light quantity of the white LED 310 or the UV LED 320, which is measured by the light quantity measuring unit 340. That is, the control board 300 measures the light quantity inside the housing 200 from the light quantity measuring unit 340, adjusts a current supplied to the white LED 310 or the UV LED 320, and thus radiates light having a preset light quantity from the white LED 310 or the UV LED 320.

The control board 300 may perform wireless communication with the smart terminal 100 through the communication unit 330.

For example, the control board 300 transmits various signals to the smart terminal 100 through Bluetooth communication.

Further, the control board 300 may receive measurement variables from the smart terminal 100 through the communication unit 330.

The measurement variables may include the type of rapid diagnostic kit 400, the types of light sources 310 and 320, the intensities of light sources 310 and 320, and signal processing variables for determining a diagnosis result of the rapid diagnostic kit 400, but the present invention is not limited thereto. The measurement variables may be stored at optimized values in an application of the smart terminal 100 for each rapid diagnostic kit 400.

The control board 300 controls the light sources 310 and 320, the light quantity measuring unit 340, and the battery 350 according to the measurement variables. For example, the control board 300 may supply power to the light sources 310 and 320, the light quantity measuring unit 340, or the communication unit 330 through the battery 350. The control board 300 may adjust the light quantities of the light sources 310 and 320. The control board 300 may measure the light quantity through the light quantity measuring unit 340. The control board 300 may perform wired/wireless communication through the communication unit 330. In this case, the control board 300 may receive the measurement variables from the smart terminal 100 through the communication unit 330 and may control at least one of the light sources 310 and 320, the light quantity measuring unit 340, and the battery 350 according to the measurement variables.

The light sources 310 and 320 illuminate the rapid diagnostic kit 400.

The light sources 310 and 320 may include the white LED 310 or the UV LED 320, but the present invention is not particularly limited thereto, and light sources that radiate various types of light may be employed depending on the type of rapid diagnostic kit 400.

The white LED 310 is installed under the control board 300 and radiates white light toward the rapid diagnostic kit

400. A plurality of white LEDs 310 may be provided, and the number of installed white LEDs 310 is not particularly limited thereto.

The white LED 310 may be used in a color-generative rapid diagnostic kit 400 in which the signal line 410 appears as a colored line.

The UV LED 320 is installed under the control board 300 and radiates ultraviolet light toward the rapid diagnostic kit 400. A plurality of UV LEDs 320 may be provided, and the number of installed UV LEDs 310 is not particularly limited thereto.

The UV LED 320 may be used in a fluorescent rapid diagnostic kit 400 in which the signal line 410 appears as a fluorescent line.

Meanwhile, the white LED 310 and the UV LED 320 may be installed in an array symmetrical with respect to the rapid diagnostic kit 400, and the control board 300 on which these components are installed may be installed tilted at a certain angle.

In this way, the rapid diagnostic kit reader 500 according to the embodiment of the present invention includes both the white LED 310 and the UV LED 320, and thus may be commonly used for the color-generative rapid diagnostic kit 400 and the fluorescent rapid diagnostic kit 400.

The light quantity measuring unit 340 is installed under the control board 300 and measures the quantities of light radiated from the light sources 310 and 320, for example, the white LED 310 and the UV LED 320.

The light quantity measuring unit 340 may be a photodiode, but the present invention is not particularly limited thereto.

The quantities of light radiated from the white LED 310 and the UV LED 320 may be set through the smart terminal 100. This will described below.

The communication unit 330 performs wireless communication with the smart terminal 1000 through various communication networks. The communication unit 330 receives the measurement variables set in the smart terminal 100 to transmit the received measurement variables to the control board 300 and transmits control result of the battery 350, the white LED 310, the UV LED 320, and the light quantity measuring unit 340 of the control board 300 to the smart terminal 100.

The communication unit 330 may perform wireless communication with the smart terminal 100 through Bluetooth or Wi-Fi but the communication method is not particularly limited thereto.

The battery 350 supplies power to the measurement module 600. The battery 350 may be a rechargeable battery, and a connector (not illustrated) for charging the battery may be installed on one side of the housing 200. Accordingly, the measurement module 600 may be portable and may be easily used in various places.

The rapid diagnostic kit 400 is seated on a kit tray 430. A fixing groove is formed in the kit tray 430 to correspond to a shape of the rapid diagnostic kit 400, and the rapid diagnostic kit 400 is seated in the fixing groove.

Referring to FIG. 3, the outer shape and size of the kit tray 430 may be variously formed according to various types of rapid diagnostic kits 400. Further, the size and structure of the fixing groove formed in the kit tray 430 may be variously changed according to the type of the rapid diagnostic kit 400.

Referring to FIG. 2, the tray fixing unit 220 may allow the rapid diagnostic kit 400 to be fixed at a certain position below the camera 110 when the kit tray 430 is inserted into the measurement module 600. For example, the kit tray 430 and the tray fixing unit 220 may be fixed to each other through a magnetic force mechanism or a spring mechanism.

The slot 230 is formed in the housing 200 of the measurement module 600 to allow the kit tray 430 to be inserted into the measurement module 600 or to be discharged the outside.

The optical path adjusting unit 260 allows a surface of the membrane 420 of the rapid diagnostic kit 400 to be irradiated with light from the white LED 310 and the UV LED 320.

For example, the optical path adjusting unit 260 may be provided with a blocking diaphragm, a reflective mirror, and a light diffuser.

Undescribed reference numeral 210 refers to a dark room.

Figure 4:
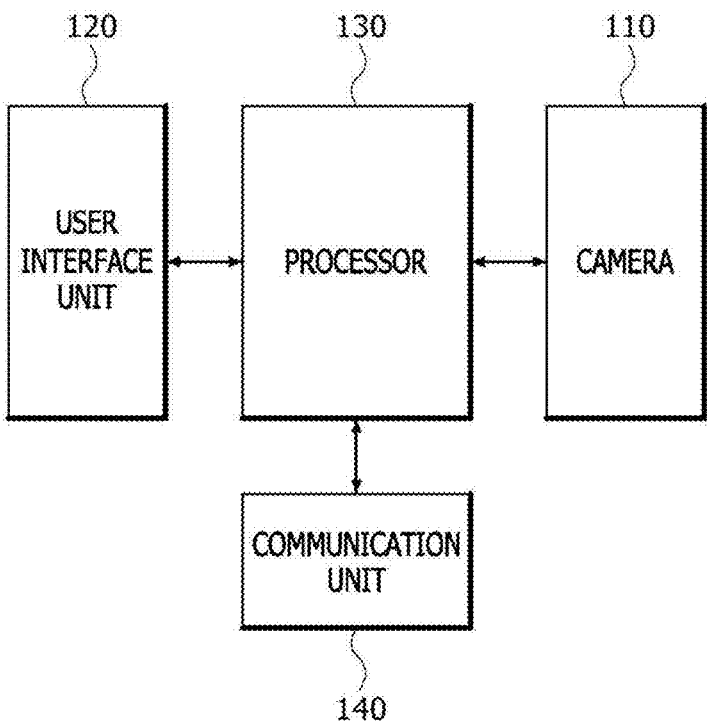
FIG. 4 is a block diagram for describing a smart terminal according to the embodiment of the present invention.

FIG. 4 is a block diagram for describing a smart terminal according to the embodiment of the present invention.

The smart terminal 100 photographs the membrane 420 of the rapid diagnostic kit 400 inserted into the measurement module 600, analyzes a captured image, and determines a diagnosis result of the rapid diagnostic kit 400.

Referring to FIG. 4, the smart terminal 100 includes the camera 110, a user interface unit 120, a communication element 140, and a processor 130.

The camera 110 photographs the membrane 420 of the rapid diagnostic kit 400 through the photographing assistant unit 250 and transmits the captured image to the processor 130.

The communication element 140 performs wireless communication with the measurement module 600. The communication element 140 may transmit the measurement variables to the measurement module 600 or receive control results of the measurement module 600.

Further, the communication element 140 may transmit analysis results of the rapid diagnostic kit 400 to a server 800 or a terminal 700 through a communication network.

The communication networks include a $3^{rd}$ generation partnership project (3GPP), a long term evolution (LTE), a fifth generation, a world interoperability for microwave access (WiMAX), a wired and wireless Internet, a local area network (LAN), a wireless LAN, a wide area network (WAN), a personal area network (PAN), Bluetooth, Wi-Fi, and the like, but the present invention is not limited thereto.

The user interface unit 120 provides a user interface.

The user interface unit 120 may receive various control commands from the user and output an operation result of the processor 130. For example, the user interface unit 120 may receive the measurement variables from the user. The user interface unit 120 may display control results of the measurement module 600. The user interface unit 120 may output analysis results for the rapid diagnostic kit 400.

The user interface unit 120 may be provided as a user interface such as a touch pad, a touch screen, an electronic pen, or a touch button. Further, the user interface unit 120 may include a printer, a display, and the like to output data. Here, for example, the display may be implemented as a thin film transistor-liquid crystal display (TFT-LCD) panel, an LED panel, an organic LED (OLED) panel, an active matrix OLED (AMOLED) panel, or a flexible panel.

The processor 130 is equipped with an application for rapid diagnostic kit analysis. The processor 130 may execute the application according to a user's control command input from the user interface unit 120. In this case, the processor 130 may provide various menus for rapid diagnostic kit analysis to the user and perform rapid diagnostic kit analysis step by step.

In more detail, the processor 130 transmits the measurement variables to the measurement module 600. In this case, the control board 300 may radiate light through the white LED 310 or the UV LED 320 onto the rapid diagnostic kit 400 according to the measurement variables and control a current of the white LED 310 or the UV LED 320 according to a light quantity measured through the light quantity measuring unit 340. Thereafter, when a set light quantity is radiated and then stabilized, the control board 300 requests the smart terminal 100 to start image measurement.

Upon receiving the request to start the image measurement from the control board 300, the processor 130 waits for a preset reaction time so that a reaction may be sufficiently performed in the rapid diagnostic kit 400. In this case, the processor 130 may turn on the white LED 310 through the control board 300, capture an image of the membrane 420 in real time with the camera 110, display the image through the user interface unit 120, and thus allow the user to identify a reaction progress situation during a reaction time.

When the reaction time elapses, the processor 130 photographs the membrane 420 through the camera 110. The processor 130 may repeatedly photograph the membrane 420 several times.

The processor 130 analyzes an image captured by photographing the membrane 420 and quantitatively determines the diagnosis result for the rapid diagnostic kit 400. That is, the processor 130 processes RGB signals of the image captured by photographing the membrane 420 to obtain a quantitative numerical value for each signal line 410 of the rapid diagnostic kit 400. Here, the quantitative numerical value may be a representative value of a numerical area for each signal line. The representative value of the numerical area for each signal line will be described below.

The processor 130 compares the quantitative numerical value with a preset positive determination threshold, a present negative determination threshold, and a retest determination threshold and determines a reaction result as one of a positive state, a negative state, and a retest state according to the comparison result. A process of analyzing, by the processor 130, the image captured by photographing the membrane 420 will be described in detail with reference to FIGS. 6 and 7.

The processor 130 stores the derived quantitative numerical value and a determination result in a memory and transmits the quantitative numerical value and the determination result to the server 800 or the terminal 700 through the communication element 140.

The processor 130 receives the measurement variables from the user interface unit 120 and transmits the measurement variables to the measurement module 600 through the communication element 140.

The processor 130 receives the control results of the measurement module 600 through the communication element 140 and displays the control results through the user interface unit 120.

The processor 130 may be connected to the memory that stores various commands for rapid diagnostic kit analysis. The commands may include a command for executing an application according to a control command of the user interface unit 120, providing, to the user, various menus for rapid diagnostic kit analysis, performing the rapid diagnostic kit analysis step by step, and storing and transmitting a result of the rapid diagnostic kit analysis.

The memory may include a magnetic storage medium or a flash storage medium in addition to a volatile storage device that requires power to maintain stored information, but the scope of the present invention is not limited thereto.

The processor 130 may be configured such that a component for forming each function is divided at a hardware level, a software level, or a logic level. In this case, dedicated hardware may be used to perform each function. To this end, the processor 130 may be implemented with or include at least one of an application specific integrated circuit (ASIC), a digital signal processor (DPS), a programmable logic device (PLD), a field programmable gate array (FPGA), a central processing unit (CPU), a micro controller and/or a micro processor.

Figure 5:
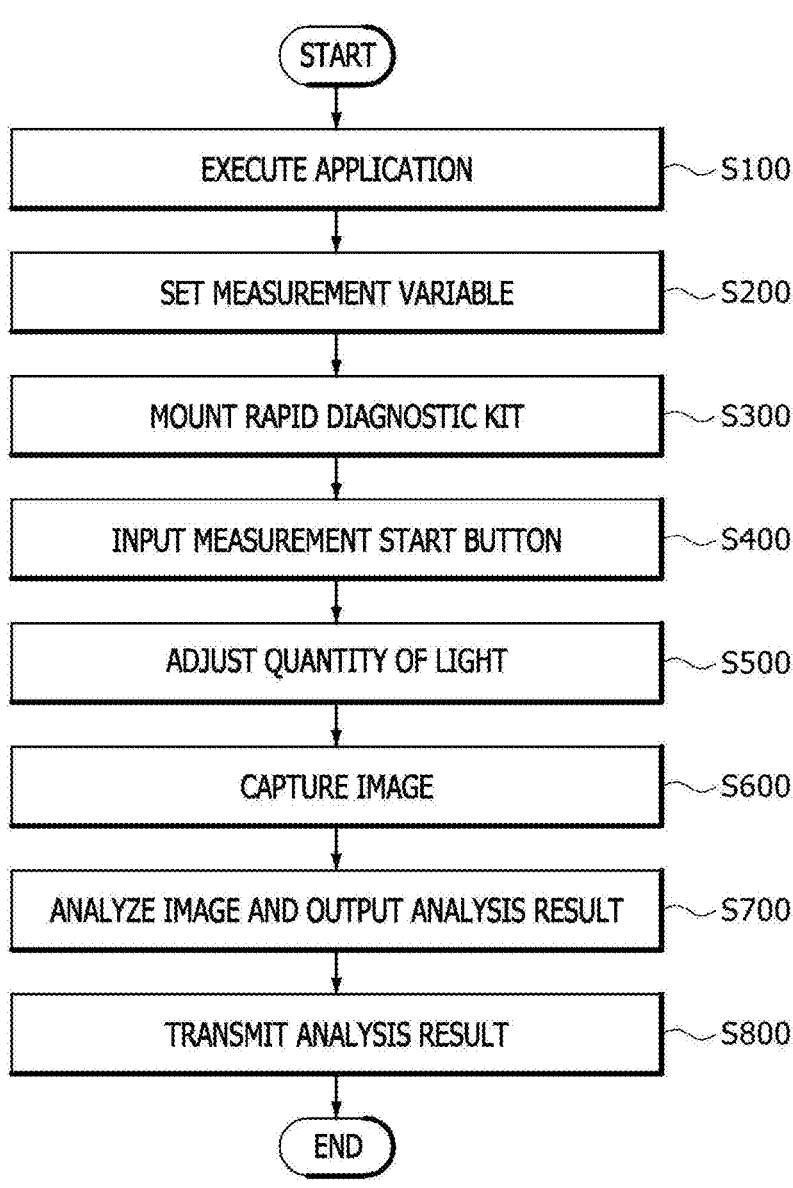
FIG. 5 is a flowchart illustrating an operation process of the rapid diagnostic kit according to the embodiment of the present invention.

FIG. 5 is a flowchart illustrating an operation process of the rapid diagnostic kit according to the embodiment of the present invention.

Referring to FIG. 5, first, the user mounts the smart terminal 100 on the measurement module 600 through the smart terminal seating unit 240.

The user performs a measurement application through the user interface unit 120 (S100).

The processor 130 may receive the measurement variables through the user interface unit 120. In this case, the processor 130 may receive at least one of the type of rapid diagnostic kit 400, the types of light sources 310 and 320, the intensities of light sources 310 and 320, and the signal processing variables.

In this case, in addition to directly receiving the measurement variables from the user as described above, the processor 130 may store measurement variables optimized in advance in an application of the smart terminal 100 for each rapid diagnostic kit 400 and load the stored measurement variables.

The user mounts the rapid diagnostic kit 400 on the kit tray 430 (S300) and puts a measurement sample into the sample inlet 440.

The user inserts the kit tray 430 to which the rapid diagnostic kit 400 is fixed into the measurement module 600 through the slot 230 of the measurement module 600 so that the kit tray 430 is fixed by the tray fixing unit 220.

Next, the processor 130 displays a measurement start button of the measurement application through the user interface unit 120 and receives input from the user (S400).

In this case, the processor 130 may wait for a preset reaction time so that the rapid diagnostic kit 400 may perform a reaction. In this case, the processor 130 turns on the white LED 310, photographs the membrane 420 through the camera 110, and displays the captured image in real time through the user interface unit 120.

The processor 130 transmits the measurement variables set as described above to the measurement module 600 through the communication element 140.

The control board 300 of the measurement module 600 controls the white LED 310 or UV LED 320 according to the measurement variables received from the processor 130 and radiates light onto the rapid diagnostic kit 400. In this case, the processor 130 measures the light quantity through the light quantity measuring unit 340, controls a current of the white LED 310 or the UV LED 320 according to the measured light quantity, and thus adjusts light quantities thereof (S500).

When the light quantity emitted from the white LED 310 or the UV LED 320 reaches a set light quantity and is stabilized, the control board 300 requests the smart terminal 100 to start the image measurement.

In response to the image measurement time request from the control board 300, the processor 130 captures an image of the membrane 420 through the camera 110 (S600). The processor 130 may measure the light quantities several times as needed and average the light quantities.

The processor 130 analyzes the image captured by photographing the membrane 420 and outputs the analysis result (S700). That is, the processor 130 processes RGB signals of the image captured by photographing the membrane 420 to obtain a quantitative numerical value for each signal line 410 of the rapid diagnostic kit 400. The processor 130 compares the quantitative numerical value with a preset positive determination threshold, a present negative determination threshold, and a retest determination threshold and determines a reaction result as one of a positive state, a negative state, and a retest state according to the comparison result.

The processor 130 stores derived quantitative numerical values and determination results in the memory and transmits the derived quantitative numerical values and the determination results to the server 800 or the terminal 700 (S800).

Thereafter, the user separates the rapid diagnostic kit 400 from the rapid diagnostic kit reader 500 and completes the measurement.

Next, a process of analyzing the image captured by photographing the membrane 420 and outputting the analysis result will be described in detail with reference to FIGS. 6 and 7.

Figure 6:
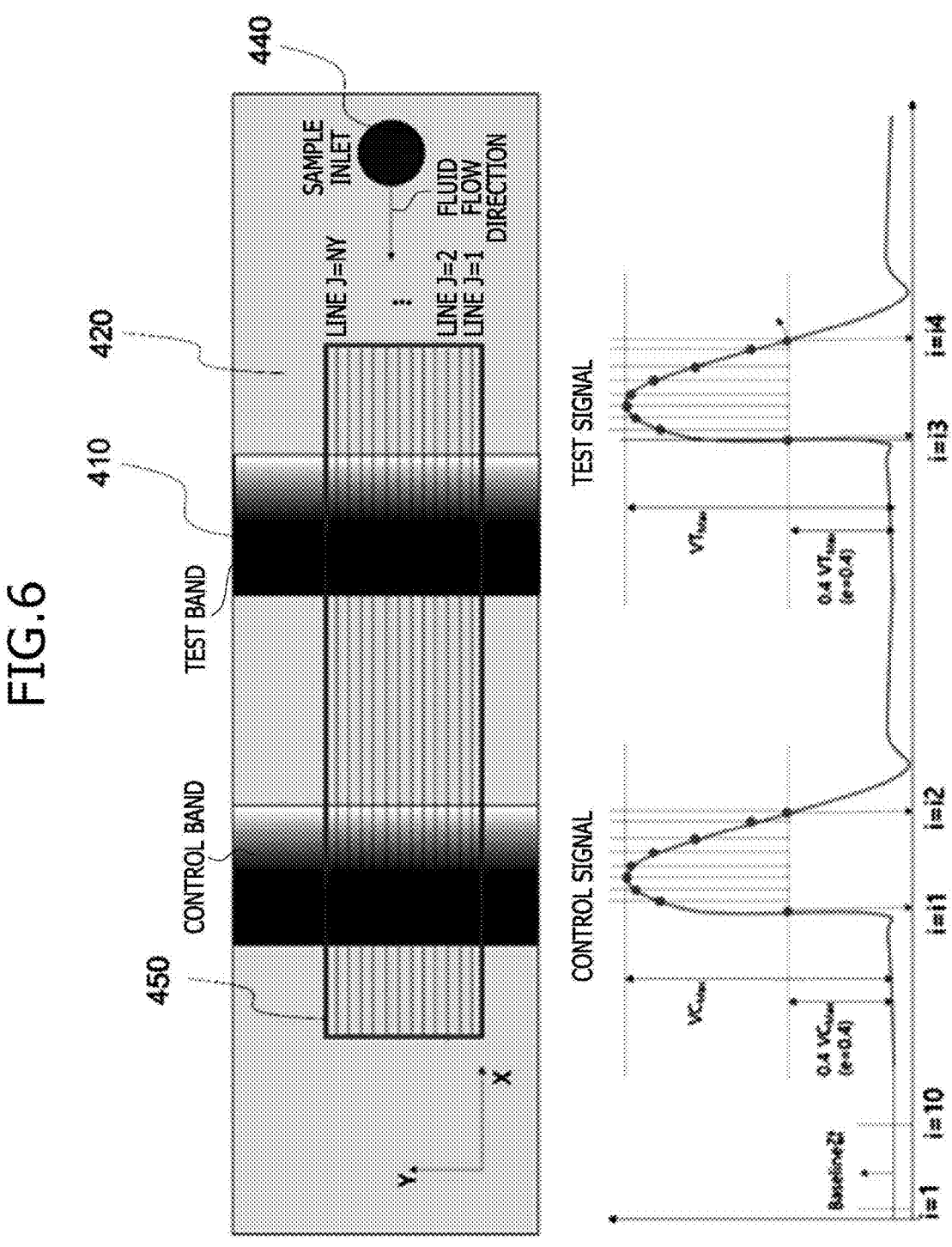
FIG. 6 is a view illustrating a signal of the rapid diagnostic kit according to the embodiment of the present invention.
Figure 7:
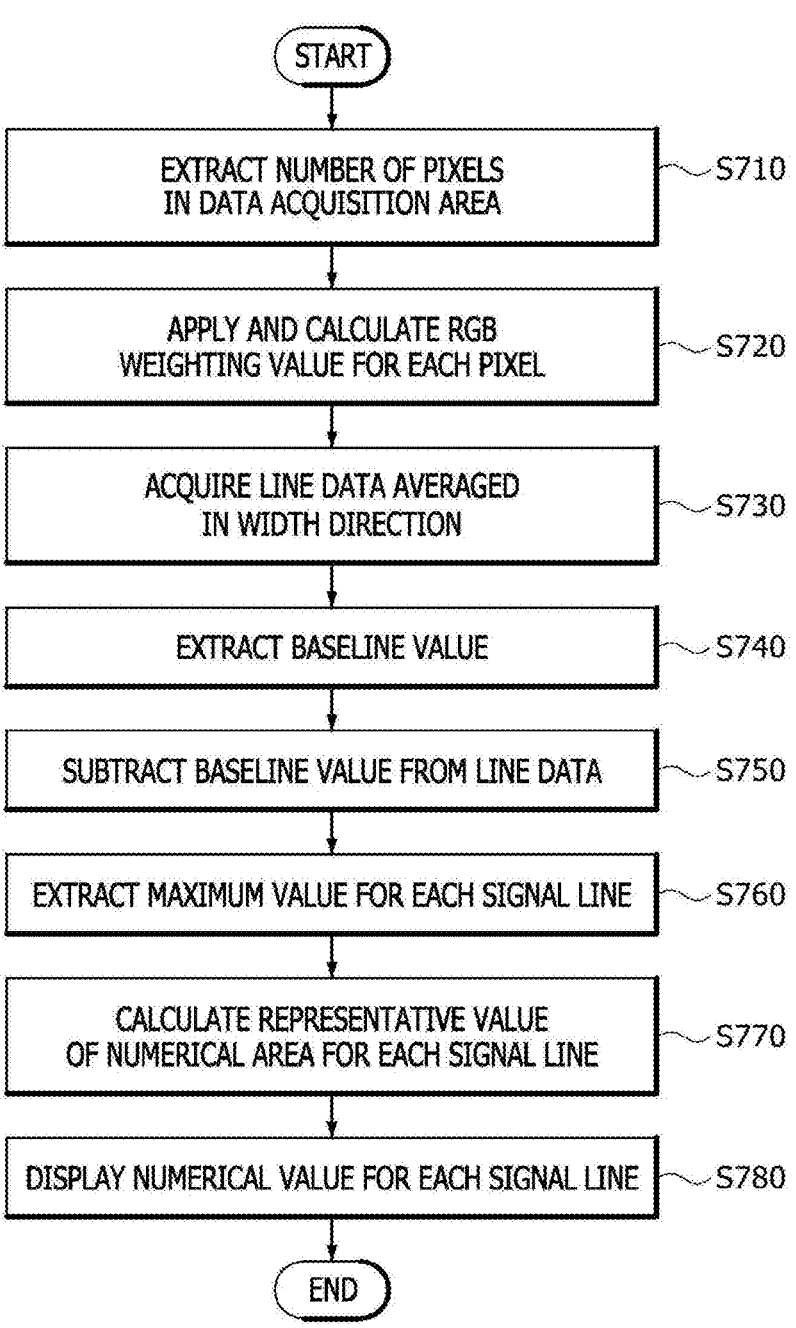
FIG. 7 is a flowchart illustrating a signal processing process of the rapid diagnostic kit reader according to the embodiment of the prevent invention.

FIG. 6 is a view illustrating a signal of the rapid diagnostic kit according to the embodiment of the present invention, and FIG. 7 is a flowchart illustrating a signal processing process of the rapid diagnostic kit reader according to the embodiment of the prevent invention.

Referring to FIGS. 6 and 7, one or more signal lines 410 appear on the membrane 420, and the data acquisition area 450 including the entirety of the signal lines 410 is set in the membrane 420.

The processor 130 extracts pixel information of the data acquisition area 450 from the image captured by photographing the membrane 420.

In each pixel, an area R (red), an area G (green), and an area B (blue) are stored as values in a range of 0 to 255.

A method of quantifying the signal line 410 in the data acquisition area 450 may be modified and applied in various manners, for example, changing the number of signal lines 410, as needed.

First, the processor 130 extracts the number of pixels in the data acquisition area 450 (S710). Here, the number of pixels on an X axis is called NX, and the number of pixels on a Y axis is called NY.

The processor 130 calculates pixel information on each pixel as follows after applying a preset RGB weighting value to each RGB for each pixel (S720).

$$V(i, j) = a \times R(i, j) + b \times G(i, j) +$$
$$c \times B(i, j) \, (i = 1 \text{ to } NX, j = 1 \text{ to } NY, a + b + c = 1)$$

Here, V(i, j) denotes pixel information. a, b, and c denote weighted values of respective RGBs. R, G, and B denote an R value, a G value, and a B value in a range of 0 to 255. i, j denote pixel coordinates of a horizontal line and a vertical line.

The processor 130 averages NY horizontal lines and calculates horizontal line data as follows (S730).

$$Va(i) = \sum V(i, j)/NY \, (i = 1 \text{ to } NX, j = 1 \text{ to } NY)$$

Here, Va(i) denotes the horizontal line data.

The processor 130 calculates a baseline value as follows (S740). The baseline value denotes an average value of signal-free portions (left horizontal portions, i=1 to 10) of the data acquisition area 450.

$$BaseV = \sum Va(i)/10 \ (i = 1 \ \text{to} \ 10)$$

The processor 130 subtracts the baseline value from the horizontal line data as follows (S750).

$$VMB(i) = Va(i) - BaseV \ (i = 1 \ \text{to} \ NX)$$

The processor 130 extracts a maximum value for each signal line 410 from among values obtained by subtracting the baseline value from the horizontal line data (S760). That is, the processor 130 calculates a maximum value VCMax of a left control signal and a maximum value VTMax of a right test signal by comparing the values obtained by subtracting the baseline value from the horizontal line data with each other (S760). Here, the maximum value VCMax of the left control signal is a maximum value of VMB(i) in a left signal. The maximum value VTMax of the right test signal is a maximum value of the VMB(i) in a right signal.

The processor 130 calculates the representative value of the numerical area for each signal line 410 (S770).

That is, the processor 130 searches for an interval i1 to i2 that satisfies a condition in which VMB(i)>e×VCMax in the left control signal.

Here, e is a constant value and may be arbitrarily set within a range of 0 to 0.99. As an example, a case in which e is 0.1 may be applied to a case in which a signal area greater than 10% of the maximum value (the maximum value VCMax of the left control signal) is set as a numerical area. As a case in which e is 0.9 may be applied to a case in which a signal area greater than 90% of the maximum value (the maximum value VCMax of the left control signal) is set as a numerical area. For reference, FIG. 6 illustratively illustrates a case in which e is 0.4.

Further, the processor 130 searches for an internal i3 to i4 that satisfies a condition in which VMB(i)>e×VTMax in the right test signal. Here, e is a constant value and may be arbitrarily set within a range of 0 to 0.99. For reference, FIG. 6 illustrates an example case in which e is 0.4.

The processor 130 calculates the representative value for each numerical area calculated as described above.

The processor 130 calculates the representative value of the numerical area of the control signal as follows.

$$Control = \sum VMB(i)/(i2 - i1 + 1) \ (i = i1 \sim i2)$$

Here, Control is the representative value of the numerical area of the control signal.

The processor 130 calculates the representative value of the numerical area of the test signal as follows.

$$Test = \sum VMB(i)/(i4 - i3 + 1) \ (i = i3 - i4)$$

Here, Test is the representative value of the numerical area of the test signal.

The processor 130 displays the representative value of the numerical area of the control signal and the representative value of the numerical area of the test signal through the user interface unit 120 (S780).

FIG. 8 is a view illustrating a function of the smart terminal and a measurement module according to the embodiment of the present invention.

Referring to FIG. 8, the measurement module 600 performs a power supply function, a light source adjusting function, a light quantity measuring function, a rapid diagnostic kit 400 mounting function, a smart terminal mounting function, and a Bluetooth communication function.

The smart terminal 100 performs a display function, an application (app) running function, a measurement variable setting function, a camera image measuring function, a signal processing function, a measurement result storing function, a Bluetooth communication function, and an Internet communication function through an application of the smart terminal 100. Meanwhile, the application of the smart terminal 100 may display a real-time measurement window, a measurement variable setting window, and a measurement result storing communication window.

In this way, the smart terminal 100 performs various functions for diagnosing the rapid diagnostic kit 400, so that the low-cost rapid diagnostic kit reader 500 having the miniaturized measurement module 600 may be provided.

Figure 9:
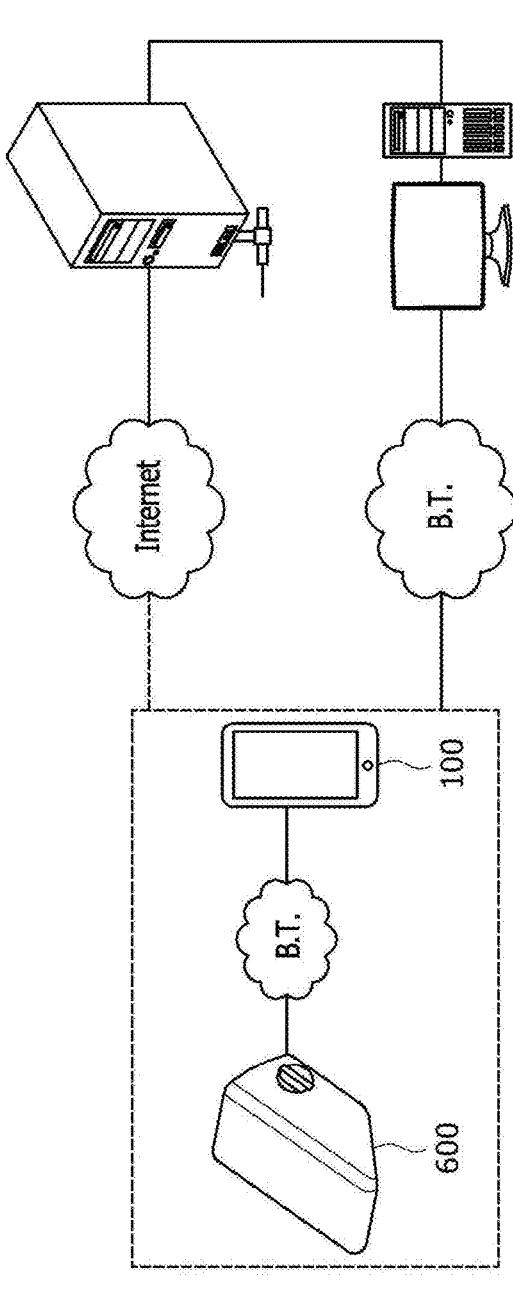
FIG. 9 is an exemplary view illustrating a communication method of the rapid diagnostic kit reader according to the embodiment of the present invention.

FIG. 9 is an exemplary view illustrating a communication method of the rapid diagnostic kit reader according to the embodiment of the present invention.

Referring to FIG. 9, the measurement variable set in the smart terminal 100 is transmitted to the measurement module 600, and in the measurement module 600, measurement operation information is transmitted to the smart terminal 100. This process may be performed through Bluetooth wireless communication. If necessary, the smart terminal 100 and the measurement module 600 may also be connected by wire.

Meanwhile, an analysis result derived from the rapid diagnostic kit reader 500 may be stored in the memory of the smart terminal 100 through the communication network and may be transmitted to the terminal 700 in the field and the server 800. Further, previous measurement information stored in the terminal 700 and the server 800 may be transmitted to the smart terminal 100 again.

Here, a communication method between the smart terminal 100 and the measurement module 600 and a communication method between them and the terminal 700 and the server 800 are not particularly limited.

In this way, the rapid diagnostic kit reader according to the embodiment of the present invention can perform measurement for both the fluorescent and color-generative rapid diagnostic kits.

Further, the rapid diagnostic kit reader according to the embodiment of the present invention reduces the possibility of human visual discrimination errors and quantitatively determines the diagnostic results of the rapid diagnostic kit.

Further, the rapid diagnostic kit reader according to the embodiment of the present invention can implement various functions based on the smart terminal, thereby realizing miniaturization and low costs.

Further, the rapid diagnostic kit reader according to the embodiment of the present invention can perform measurement for rapid diagnostic kits having various shapes and improve versatility and measurement reproducibility.

Although the present invention has been described with reference to embodiments illustrated in the drawings, the description is merely illustrative, and those skilled in the art to which the technology belongs should understand that various modifications and other equivalent embodiments may be made.

Thus, the technical scope of the present invention should be determined by the appended claims.

What is claimed is:

1. A rapid diagnostic kit reader comprising a smart terminal, wherein:

the smart terminal comprises:

a user interface unit;

a camera configured to photograph a membrane of a rapid diagnostic kit inserted into a measurement module; and a processor configured to determine a diagnosis result of the rapid diagnostic kit based on an image captured by photographing the membrane and display the diagnosis result through the user interface unit, and the smart terminal is seated on the measurement module, wherein the processor receives a measurement variable through the user interface unit and transmits the received measurement variable to the measurement module, wherein the measurement variable includes a combination of a type of rapid diagnostic kit and at least one of a type of light source configured to radiate light into the measurement module, an intensity of the light source, and a signal processing variable for determining the diagnosis result of the rapid diagnostic kit.

2. The rapid diagnostic kit reader of claim 1, wherein at least one of the type of light source, the intensity of the light source, and the signal processing variable of is adaptively controlled by the processor in response to the type of rapid diagnostic kit.

3. The rapid diagnostic kit reader of claim 1, wherein the processor processes an RGB signal of the image captured by photographing the membrane to obtain a quantitative numerical value for each signal line of the rapid diagnostic kit, and compares the quantitative numerical value with a preset positive determination reference value, a preset negative determination reference value, and a preset retest determination reference value to determine a reaction result as one of a positive state, a negative state, and a retest state according to the comparison result.

4. The rapid diagnostic kit reader of claim 3, wherein the processor extracts the number of pixels of a data acquisition area in the membrane on an X axis and an Y axis from the image captured by photographing the membrane, calculates pixel information for each pixel by applying an RGB weighting value set for each RGB for each pixel, calculates horizontal line data by averaging a number of horizontal lines corresponding to the number of pixels on the Y axis (NY) based on the pixel information, calculates a maximum value for each signal line by subtracting a baseline value in which there is no signal in the data acquisition area from the horizontal line data, calculates a numerical area for each signal line based on the maximum value for each signal line, and then calculates a representative value of the numerical area.

5. A rapid diagnostic kit reader comprising:

a slot through which a rapid diagnostic kit is inserted into a housing or is discharged to the outside;

a photographing assistant unit configured to allow a camera of a smart terminal to photograph the rapid diagnostic kit inserted into the housing;

a light source configured to illuminate the rapid diagnostic kit inserted into the housing; and a control board configured to control the light source to illuminate the rapid diagnostic kit so that the camera of the smart terminal photographs the rapid diagnostic kit inserted into the housing, wherein the control board receives a measurement variable from the smart terminal and controls the light source according to the measurement variable, wherein the measurement variable includes a combination of a type of rapid diagnostic kit and at least one of a type of light source, an intensity of the light source, and a signal processing variable for determining a diagnosis result of the rapid diagnostic kit.

6. The rapid diagnostic kit reader of claim 5, further comprising a smart terminal seating unit formed in the housing to allow the smart terminal to be seated in the housing.

7. The rapid diagnostic kit reader of claim 5, wherein the photographing assistant unit is a transparent window formed transparently at a position corresponding to the camera of the smart terminal.

8. The rapid diagnostic kit reader of claim 7, wherein, in the transparent window, an optical filter is additionally mounted or replaced according to fluorescence used in the rapid diagnostic kit.

9. The rapid diagnostic kit reader of claim 5, wherein the light source includes at least one of a white light emitting diode (LED) configured to radiate white light and an ultraviolet ray (UV) LED configured to radiate ultraviolet light.

10. The rapid diagnostic kit reader of claim 9, further comprising a light quantity measuring unit configured to measure a light quantity inside the housing, wherein the control board controls the light source according to a quantity of light inside the housing, which is measured by the light quantity measuring unit, to adjust a quantity of light inside the housing.

11. The rapid diagnostic kit reader of claim 5, further comprising an optical path adjusting unit configured to uniformly radiate light of the light source onto a surface of a membrane of the rapid diagnostic kit.

12. The rapid diagnostic kit reader of claim 5, wherein at least one of the type of light source, the intensity of the light source, and the signal processing variable is adaptively controlled in response to the type of rapid diagnostic kit.

13. A rapid diagnostic kit reader comprising:

a measurement module into which a rapid diagnostic kit is inserted; and a smart terminal seated on the measurement module, configured to transmit a measurement variable to the measurement module, configured to photograph a membrane of the rapid diagnostic kit inserted into the measurement module, configured to analyze an image captured by photographing the membrane, and configured to determine a diagnosis result of the rapid diagnostic kit, wherein the measurement variable includes a combination of a type of rapid diagnostic kit and at least one of a type of light source configured to radiate light into the measurement module, an intensity of the light source, and a signal processing variable for determining the diagnosis result of the rapid diagnostic kit.

14. The rapid diagnostic kit reader of claim 13, wherein the smart terminal includes:

a user interface unit;

a camera configured to photograph the membrane of the rapid diagnostic kit inserted into the measurement module; and a processor configured to determine a diagnosis result of the rapid diagnostic kit based on an image captured by photographing the membrane and display the diagnosis result through the user interface unit.

15. The rapid diagnostic kit reader of claim 14, wherein the processor processes an RGB signal of the image captured by photographing the membrane to obtain a quantitative numerical value for each signal line of the rapid diagnostic kit, and compares the quantitative numerical value with a preset positive determination reference value, a preset negative determination reference value, and a preset retest determination reference value to determine a reaction result as one of a positive state, a negative state, and a retest state according to the comparison result.

16. The rapid diagnostic kit reader of claim 14, wherein the processor extracts the number of pixels of a data acquisition area in the membrane on an X axis and an Y axis from the image captured by photographing the membrane, calculates pixel information for each pixel by applying an RGB weighting value set for each RGB for each pixel, calculates horizontal line data by averaging a number of horizontal lines corresponding to the number of pixels on the Y axis (NY) based on the pixel information, calculates a maximum value for each signal line by subtracting a baseline value in which there is no signal in the data acquisition area from the horizontal line data, calculates a numerical area for each signal line based on the maximum value for each signal line, and then calculates a representative value of the numerical area.

17. The rapid diagnostic kit reader of claim 13, wherein the measurement module includes:

a smart terminal seating unit formed in a housing and configured to allow the smart terminal to be seated on the housing;

a slot through which the rapid diagnostic kit is inserted into the housing or discharged to the outside;

a photographing assistant unit configured to allow a camera of the smart terminal to photograph the rapid diagnostic kit inserted into the housing;

a light source configured to illuminate the rapid diagnostic kit inserted into the housing;

a light quantity measuring unit configured to measure a quantity of light in the housing; and a control board configured to control the light source according to the quantity of light inside the housing, which is measured by the light quantity measuring unit, and illuminate the rapid diagnostic kit.

18. The rapid diagnostic kit reader of claim 17, wherein the light source includes at least one of a white light emitting diode (LED) configured to radiate white light and an ultraviolet ray (UV) LED configured to radiate ultraviolet light.

* * * * *